United States Patent

Klamp

[15] 3,640,226
[45] Feb. 8, 1972

[54] CONVEYOR SYSTEM
[72] Inventor: Paul Klamp, St. Clare Shores, Mich.
[73] Assignee: American Chain & Cable Company, Inc., New York, N.Y.
[22] Filed: Aug. 28, 1969
[21] Appl. No.: 853,845

[52] U.S. Cl. ............................................104/96, 104/172 S
[51] Int. Cl. ......................................................B65g 17/42
[58] Field of Search ..........................................104/172, 96

[56] References Cited

UNITED STATES PATENTS 3,451,352   6/1969   Currey et al. ..........................104/172

*Primary Examiner*—Arthur L. La Point
*Assistant Examiner*—Robert Saifer
*Attorney*—Barness, Kisselle, Raisch & Choate

[57] ABSTRACT

A conveyor system including a first load supporting track and a second load supporting track with an intermediate transfer portion. A powered conveyor is provided in association with each of the first and second tracks. A plurality of carriers are provided. Each of the carriers has a first dog that is in position for normal engagement with the pusher member of the conveyor and a second dog that is normally urged to an operative carrier pushing position but is held by the track out of operative position. At a transfer point a portion of the track is cut away to permit the second dog to move to operative carrier transferring position.

8 Claims, 7 Drawing Figures

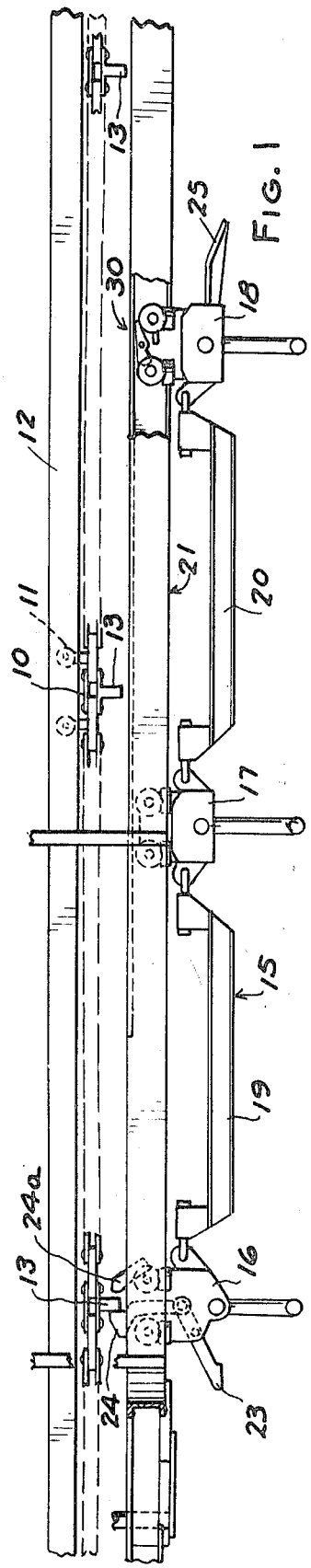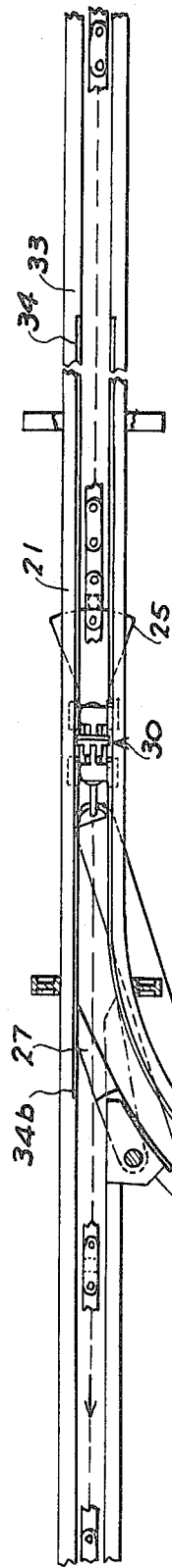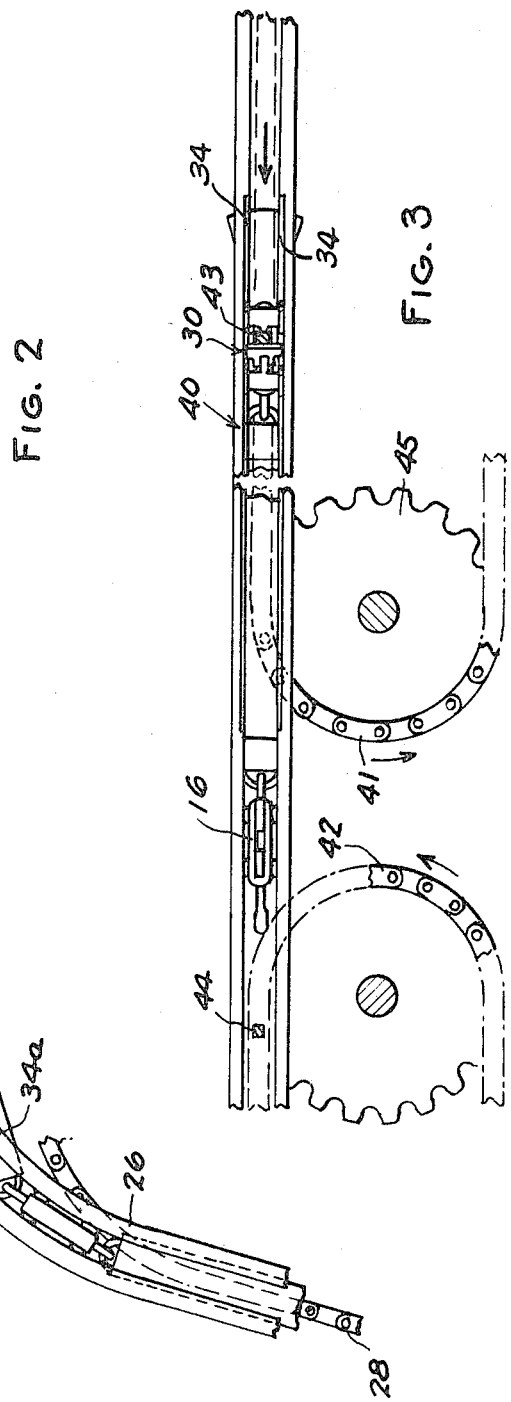

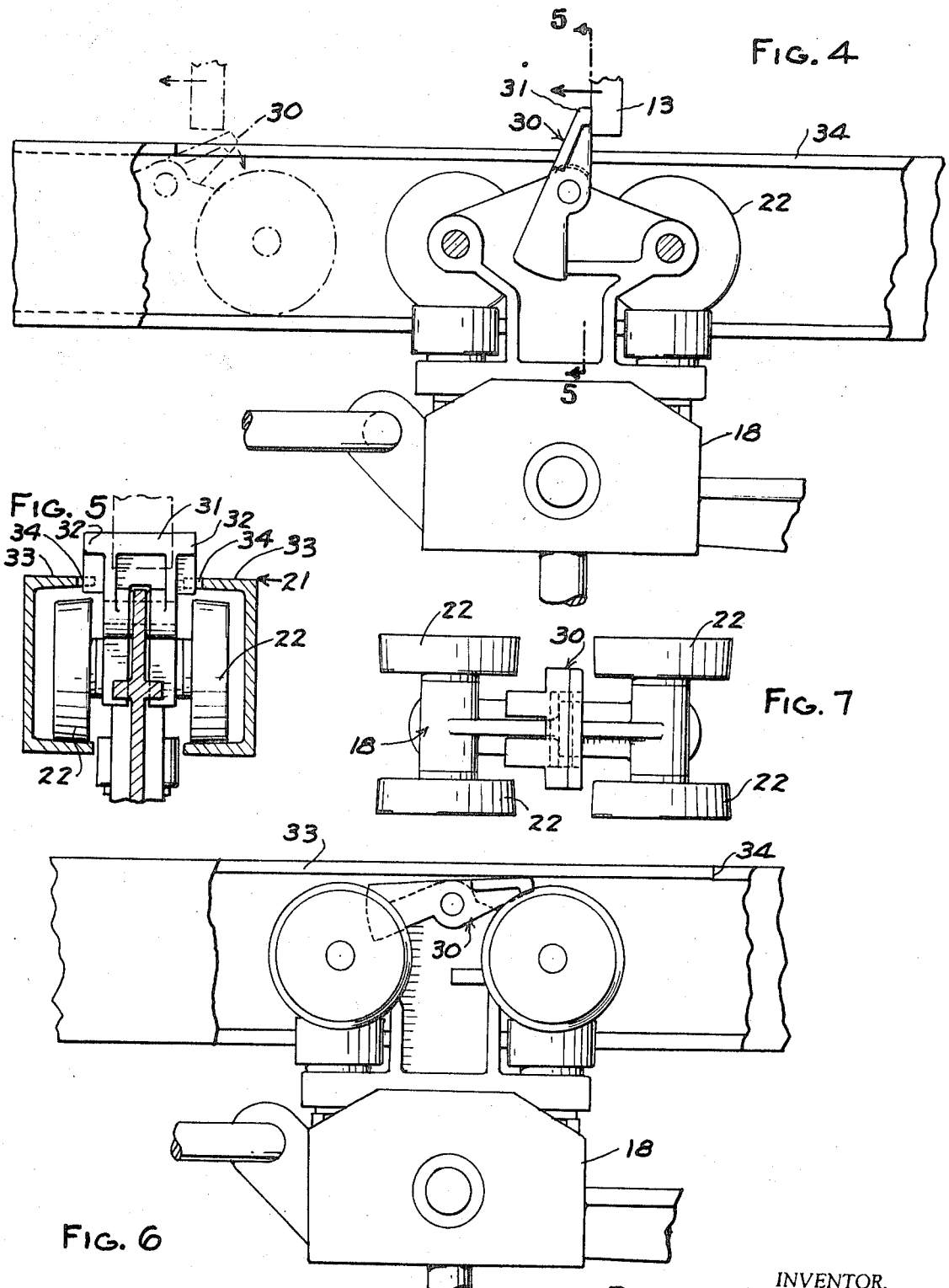

CONVEYOR SYSTEM

This invention relates to conveyor systems and particularly to power and free conveyor systems.

In power and free conveyor systems wherein carriers are moved along predetermined paths by engagement with conveyors, it is often necessary to transfer the carriers from one predetermined path to another. In one type of system, this transfer is achieved by providing a transfer conveyor that engages the carrier and transfers it between the predetermined paths. In another type of system, the carrier is moved from the one path toward the other and then pushed through the transfer area to the second path.

Among the objects of the present invention are to provide a power and free conveyor system of the latter type wherein a carrier is transferred from one predetermined path to another by pushing across a transfer zone; and wherein such system is achieved with minimum cost and maintenance.

SUMMARY OF THE INVENTION

A conveyor system including a first load supporting track and a second load supporting track with an intermediate transfer portion. A powered conveyor is provided in association with each of the first and second tracks. A plurality of carriers are provided. Each of the carriers has a first dog that is in position for normal engagement with the pusher member of the conveyor and a second pusher dog that is normally urged to an operative carrier pushing position but is held by the track out of operative position in carrier pushing position. At a transfer point a portion of the track is cut away to permit the second dog to move to operative carrier transferring position.

DESCRIPTION OF THE DRAWINGS

FIG. 1 is a fragmentary side elevational view of a conveyor system embodying the invention.

FIG. 2 is a fragmentary plan view of the system.

FIG. 3 is a fragmentary plan view of a modified form of conveyor system.

FIG. 4 is a fragmentary elevational view on an enlarged scale of a portion of the system shown in FIG. 1.

FIG. 5 is a fragmentary sectional view taken along the line 5–5 in FIG. 4.

FIG. 6 is a fragmentary side elevational view similar to FIG. 4 showing the parts in a different operative position.

FIG. 7 is a plan view of a portion of the system shown in FIG. 4.

DESCRIPTION

Referring to FIG. 1, the invention relates to a conveyor system wherein a power chain is adapted to selectively engage trolleys and move them in predetermined paths. The trolley motion is from right to left. Specifically, conveyor chain 10 is supported by chain trolleys 11 for movement along a track 12. The chain 10 includes longitudinally spaced pushers 13 that are adapted to engage carriers, as presently described, to move them. As shown, a carrier 15 comprising longitudinally spaced trolleys 16, 17, 18 pivotally interconnected by tie bars 19, 20 is provided for movement along track 21. The trolleys include wheels 22 that engage the lower flanges of spaced inwardly facing C-shaped channels of track 21 (FIG. 5). The foremost trolley 16 includes an actuating lever 23 that is operatively connected to a pusher dog 24 so that when lever 23 engages an obstacle or a projection 25 on the rear trolley 18 of a preceding carrier, the lever 23 is swung clockwise as viewed in FIG. 1 to lower the pusher dog 24 out of the path of a pusher 13. Such an arrangement is known as an accumulating conveyor system. The foremost trolley 16 further includes a pivoted holdback dog 24a in accordance with conventional practice.

As further shown in FIG. 2, the system includes a second track 26 that extends at an angle from the track 21 and a switch tongue 27 that is operated to selectively guide the carrier 15 into the second track 26. The switch tongue 27 is controlled by signal devices such as are well known in the art, for example, as shown in the patent to Bishop U.S. Pat. No. 2,868,139. A second power chain 28 is provided in overlying relation to a portion of the track 26 and is adapted to pick up the carrier and move it along the track 26.

Referring more specifically to FIG. 4, a succeeding trolley 18 of the carrier 15 includes a pivoted pusher dog 30 that is pivoted intermediate its ends and counterweighted so that the pusher dog end 31 thereof is urged normally to operative pushing position. However, the width of pusher end 31 is such that the side edges of projections 32 normally engage the underside of the upper horizontal flanges 33 of the tracks 21 so that the pusher dog 31 is normally in the position shown in FIG. 6, namely, out of the path of pushers 13. However, in the case of the transfer of the carrier from the track 21 to the track 26 by positioning of the switch tongue 27, a portion of each flange 33 is cut away as at 34 to permit the pusher dog to swing counterclockwise under the action of the counterweight to the position shown in FIG. 4 and thereby be in position for engagement with a pusher 13 which will push the carrier 15 through the switching or transfer area into position for engagement of the leading power dog 24 with the pusher of a secondary chain 28 along second track 26.

When the switch tongue 27 is actuated to divert the carrier, the pusher 13 which is in engagement with the pusher dog 24 will disengage from the pusher dog 24 as the foremost trolley 16 of carrier 15 is diverted to the track 26. The carrier 15 will then be momentarily stopped. However, by this time, the pusher dog 30 will have been moved upwardly so that a succeeding pusher 13 of the power chain will engage the pusher dog 30 and cause the carrier 15 to be moved further along the track 26 sufficiently to permit dog 24 to be picked up by a pusher of the second power chain 28. As the carrier is moved along track 26, the upper flanges of track 26 will engage edges 32 of the pusher dog to pivot it down out of the path of the pusher of chain 28.

As shown in FIG. 2, the cutaway portion 34 extends along the track 21 in the area preceding the switch tongue 27, that is, preceding the transfer. Unless the wider section 34 is extended to 34a the trailing trolley dog 30 which in the case of switching off of a carrier is pushed by dog 13 part way into the turn, will get pinched sideways by the upper flanges of track 26. A carrier which is not switched off is pushed all the way through the switching area by engagement of its front dog 24 with a dog 13 of the power chain, so that the trailing dog 30 moves through this area without being in contact with a dog 13. As a result dog 30 is free to swing upward to its operating position at the start of the track flange cutouts 34 and is forced down again at 34b.

In a track configuration as in FIG. 2, but with the carriers and chains moving in the opposite direction, a carrier would move either from left to right on the straight tracks 21 or would enter this track from tracks 26. No cutouts 34 are needed in tracks 21 in this case, but only in tracks 26 to just beyond the area where chain 28 veers off from tracks 26, at which point the carrier rear dog 30 has been advanced far enough to place the front dog 24 into the path of the chain 10 and pusher dogs 13.

Throughout the portion of the system wherein the transfer is achieved, the relative positions vertically of the power track 12 and carrier tracks 21, 26 remain constant and are not changed.

The invention is also applicable to the transfer of the carrier from one powered conveyor to another, for example, from a faster to a slower conveyor or from a slower conveyor to a faster conveyor. Specifically, as shown in FIG. 3, the carrier is adapted to move along a track 40 in a portion between spaced power conveyors 41, 42, each of which has pushers 43, 44. As the conveyor 41 moves over its sprocket 45, the pusher 13 thereon which is in engagement with the pusher dog 24 of the carrier becomes disengaged interrupting or causing a stoppage of the carrier. At this point, cutaway portions 34 along the track 40 permit the second pusher dog 30 of the carrier to pivot upwardly into the path of a succeeding pusher 43 which then pushes the carrier across the gap between the conveyors 41, 42 bringing the leading pusher dog 24 into position for engagement with a pusher 44 of the succeeding conveyor 42. As the carrier is pulled across the space between the conveyors 41, 42, the second pusher dog 30 is depressed by engagement of flanges of track 40 with the edges 32 of the pusher dog 30.

I claim:

1. In a conveyor system, the combination comprising
means defining a first load supporting track,
a first conveyor having a portion thereof adjacent said track and including longitudinally spaced pusher members,
a plurality of carriers for movement along said track,
each said carrier having a first pusher dog,
each said carrier having a second pusher dog,
said second pusher dog being movable to and from operative position where it may be engaged by a pusher member on the conveyor,
said second pusher dog being urged upwardly into operative position,
generally horizontal portions of said track normally extending toward and overlying a portion of said second pusher dog and to engage said second pusher dog and hold said second pusher dog in inoperative position,
said second pusher dog being within the vertical confines of said track when held in inoperative position,
a second load supporting track,
means for guiding said carrier between said first and second load supporting tracks,
said generally horizontal portions of said track in the area of said last-mentioned means extending toward said second pusher dog a lesser distance and thereby permitting said second pusher dog to move upwardly in position for engagement with a pusher member of the conveyor whereby when a carrier is moved to said guiding means, a pusher member of said conveyor becomes disengaged from said first dog and a succeeding pusher member engages said second dog to push said carrier between said load supporting tracks.

2. The combination set forth in claim 1 including a second conveyor movable along said second track for engaging a dog of said carrier to move said carrier along said second track.

3. The combination set forth in claim 1 wherein said first track comprises spaced channels having horizontally extending flanges, the flanges of said channels extending inwardly toward one another and normally overlying and engaging said portion of said second dog to hold it in inoperative position.

4. The combination set forth in claim 1 wherein said carrier comprises a plurality of trolleys,
said first pusher dog being on the foremost trolley,
said second pusher dog being on a succeeding trolley.

5. The combination set forth in claim 1 wherein said second pusher dog is pivoted to said carrier and is counterweighted so that it normally is urged into the path of said pusher members on said conveyor.

6. The combination set forth in claim 1 wherein said second pusher dog comprises a portion of an element pivoted to the carrier and counterweighted so that the dog is normally in the path of the pusher members on the conveyor.

7. In a conveyor system, the combination comprising
means defining a first overhead load supporting track,
a first conveyor having a portion thereof adjacent said track and including longitudinally spaced pusher members,
a plurality of carriers for movement along said track,
each said carrier having a first pusher dog,
each said carrier having a second pusher dog,
said second pusher dog being movable to and from position where it may be engaged by a pusher member on the conveyor,
said second dog being biased upwardly into operative position,
generally horizontal portions of said track normally extending toward and overlying a portion of said second pusher dog and engaging said second pusher dog to hold said second pusher dog in inoperative position,
said second pusher dog being within the vertical confines of said track when held in inoperative position,
a second overhead load supporting track,
overhead means for guiding said carrier between said first and second load supporting tracks,
said generally horizontal portions of said track in the area of said last-mentioned means being cut away to extend toward said second pusher dog a lesser distance and thereby permit said second pusher dog to move upwardly in position for engagement with a pusher member of the conveyor whereby when a carrier is moved to said guiding means, a pusher member of said conveyor becomes disengaged from said first pusher dog and a succeeding pusher member engages said second pusher dog to push said carrier between said load supporting tracks.

8. The combination set forth in claim 7 wherein said track comprises spaced inwardly facing C-shaped channels having horizontally extending flanges, the upper flanges of said channels normally overlying and engaging said portion of said second dog to hold said dog in a position out of engagement by said pusher member.

* * * * *